Sept. 17, 1963 KIYOSHI NAKAMURA 3,104,328

EXPANSION CIRCUIT UTILIZING TRANSISTOR BIASED NEAR CUT-OFF

Filed Sept. 28, 1959

Inventor
K. NAKAMURA
By C. H. Suydam
AGENT

United States Patent Office 3,104,328

Patented Sept. 17, 1963

3,104,328

EXPANSION CIRCUIT UTILIZING TRANSISTOR BIASED NEAR CUT-OFF

Kiyoshi Nakamura, Tokyo, Japan, assignor to Nippon Electric Company Limited, Tokyo, Japan, a corporation of Japan Filed Sept. 28, 1959, Ser. No. 842,643

Claims priority, application Japan Nov. 18, 1958

4 Claims. (Cl. 307—88.5)

This invention relates to expander circuits, particularly of the type employing transistors.

The object of the invention is to devise an expander circuit which is very suitable for use in those cases where a circuit is controlled by an expanded value of an input control current.

Another object of the invention is to devise an expander circuit so that the expansion factor can be adjusted to any suitable value including an extremely high value.

Figure 1:
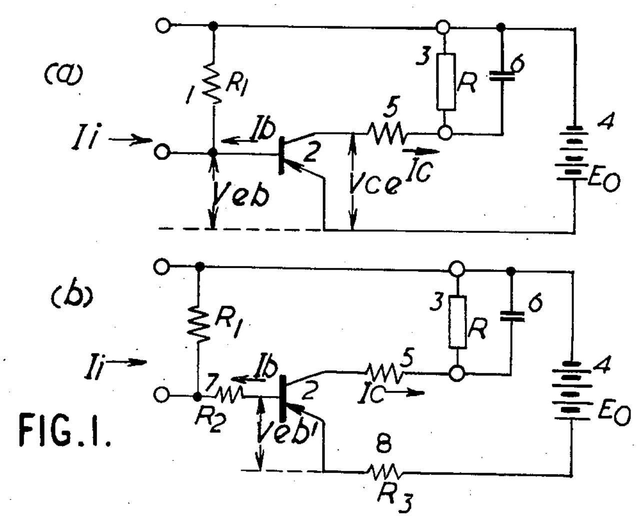

The above-mentioned and other features and objects of this invention will become apparent by reference to the following description taken in conjunction with the accompanying drawings, in which:

FIG. 1(*a*) shows the construction for an embodiment of a simple transistor expander circuit for illustrating the principle of this invention. FIGS. 1(*b*) and 2 are circuit diagrams illustrating two alternative embodiments of the present invention.

According to the principle of the invention a reference voltage provided by a constant voltage source is set up as a transistor bias voltage or cut-off point and, by comparing the transistor input signal level with the reference voltage, the variation of the input level from the reference level is obtained as an expanded output in the form of direct current flowing between two electrodes in the output circuit of the transistor. The input signal may be either a D.C. current, an A.C. current or a compound current.

Referring to FIG. 1(*a*), suppose that a bias voltage is given to transistor 2 from the power supply source 4, the voltage $E_0$ being selected as a reference voltage. Resistance 1 having a resistance value $R_1$ is the bias circuit for transistor 2 and at the same time, the input resistance. Resistance 5, having a resistance value $R_2$, is a protective resistance to be inserted in the circuit as required in order to prevent the flow of an excessive current into both the load 3 having a resistance value R and transistor 2.

Let the base current of the transistor 2 and the output current flowing in the load 3 be denoted by I*b* and I*c* respectively when the input current flowing in the input resistance 1 is at a standard level I*i*. If the relations between I*b* and I*i* are selected such that $Ib \ll Ii$, the voltage V*eb*, between the emitter and the base of transistor 2, is expressed by the following equation:

$$Veb=-E_0+R_1(Ii+Ib)\approx -E_0+R_1Ii) \qquad (1)$$

Since transistor 2 is operated in the vicinity of the cut-off point, the output current I*c* is comparatively small.

As a result, Equation 2 will be established between I*c* and V*eb* provided that at least a reverse bias voltage in excess of several tenths volts be applied to the collector-base junction in the transistor operating range and that both I*c* and V*eb* are small.

$$Ic=K\epsilon^{\lambda Veb} \qquad (2)$$

where $K$=a constant and $\lambda$ is approximately $-38.9^{-1}$ volts at a normal temperature in case of a P-N-P germanium transistor.

For a detailed explanation as to why this is so, reference is made to a paper, "Study of P-N-P Alloy Junction Transistor From D.-C. Through Medium Frequencies," by L. J. Giancoletto, appearing in the December 1954 issue of the R.C.A. Review, pages 508–516. Note FIG. 2 thereof.

In this case, since the collector current I*c* of the transistor flowing in accordance with the bias voltage V*eb* becomes the output current flowing in the load 3, the standard input current I*i*, input resistance $R_1$ and the constant reference voltage E*o* will be determined in advance so as to obtain a desired predetermined standard output current. Now where the input current varies slightly from the standard value I*i*, variations in output current with respect to the standard output current I*c* are derived as follows:

From Equations 1 and 2 we have $$Ic=K\epsilon^{\lambda(R_1Ii-E_0)}$$

$$\ln Ic=\ln K+\lambda(R_1Ii-E_0)$$

$$\frac{dIc}{Ic}=\lambda R_1Ii\frac{dIi}{Ii}$$

In other words, the ratio of variation of the output current to the standard value of the output current has been expanded as compared with the ratio of variation of the input current to the standard value of the input current.

The expansion factor under normal operating conditions in proximity to the standard operating point will be as follows:

$$\delta=\lambda R_2Ii\approx -38.9R_1Ii \qquad (3)$$

Since the expansion factor is proportional for the product $R_1$I*i*, it may be designed or adjusted to any desired value. And also an extremely high value of the expansion factor can easily be accomplished.

FIG. 1(*b*) shows a case in which resistances 7 and 8 having resistance values $R_2$ and $R_3$ are connected respectively to the base lead and the emitter lead of transistor 2. It is conceivable here that the Equation 2 will fail to establish the correct relationship because of the base lead resistance. In FIG. 1(*b*), Equation (4) for the expansion factor, which is most pertinent for practical purposes, can be obtained by the same method used for determining the expansion factor for the circuitry of FIG. 1(*a*).

$$\delta=\frac{\lambda R_1Ii}{1-NIc}\approx -\frac{38.9R_1Ii}{1+38.9NIc} \qquad (4)$$

where $$N=\frac{(R_1+R_2)}{b}+\frac{R_3}{a}$$

$a$=Current amplification factor of the transistor in the common base configuration, and $$b=\frac{a}{1-a}$$

From the point of view that the resistances 7 and 8 are regarded as including the base lead resistance and the emitter resistance of transistor 2, respectively, Equation 4 indicates that an accurate expansion factor can be obtained even in cases where both $I_c$ and V*eb* become a little larger, and the V*eb*-$I_c$ characteristics slightly deviate from the exponential characteristic curve. The values of $I_c$ and V*eb* differ with different types of transistors. Taking an alloy junction-type transistor, for example, $I_c$ and V*eb* are not greater than 10 ma. and .25 v., respectively, even when the above-mentioned viewpoint is taken (pg. 516, RCA Preview, supra). The expansion factor given in Equation 4 can be varied by connecting resistances intentionally where the values of $I_c$ and V*eb* are sufficiently small.

In other words, depending on the values of resistances 7 and 8 connected to the base and the emitter lead, respectively, the expansion factor can be adjusted over a wide range and a suitable value can easily be obtained.

Figure 2:
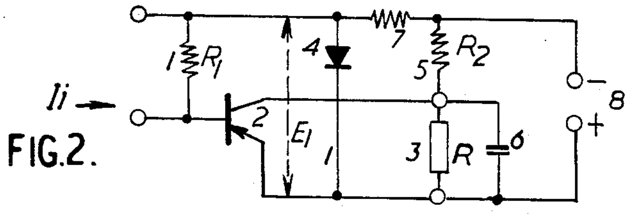

Whereas the output current of transistor 2 is indirectly utilized in FIG. 2 and the expansion polarity is negative in FIG. 1, the polarity is designed to be positive in FIG. 2. FIG. 2 shows an example of using the Zener voltage $E_1$ of a constant-voltage diode 4 as a reference voltage by taking into consideration those cases where a certain degree of variation in voltage of the power supply 8 is unavoidable. The expansion factor can be derived from the currents and voltages as shown in FIG. 2 by the same method as used for FIG. 1. The result is as shown in Equation 5.

$$\delta=\frac{-\lambda R_1 Ii}{\left(\frac{E_0}{R_2 Ic}-1\right)\left(1-\lambda\frac{R_1}{b}Ic\right)} \quad (5)$$

The expansion factor can be designed and adjusted over a wide range of values in a manner similar to that used for the circuitry of FIG. 1, e.g., by properly selecting the input current $Ii$ and the collector current $Ic$ at the standard level and the values of resistances 1 through 5. A high expansion factor can readily be obtained for this case also.

Depending on the method of selecting the input point or on the positive or negative value of the expansion polarity, as determined by the types (e.g. P-N-P or N-P-N) and the number of transistors, it is possible to develop a practical circuit employing the same principles as used above.

Where a D.C. output is desired and the input is in the form of an A.C. or compound current, or where the expansion factor becomes excessive, it sometimes happens that the output tends to become an interrupted direct current. Capacitor 6 in any of FIGS. 1 and 2 illustrates a simple example of a smoothing circuit which may be added to prevent the unstable interruption of the output current.

While I have described above the principle of my invention in connection with specific apparatus, it is to be clearly understood that this description is made only by way of example and not as a limitation to the scope of my invention as set forth in the objects thereof and in the accompanying claims.

What is claimed is:

1. A transistor expander circuit comprising a transistor; a source of predetermined constant voltage coupled at one end thereof to the emitter of said transistor, and coupled at the other end thereof to the collector of said transistor; a load impedance, having output terminals thereacross connected in series in the emitter-collector circuit; resistance means coupled between said other end of said source of constant voltage and the base of said transistor for the biassing thereof; a pair of input terminals for applying thereto a signal voltage counter said constant voltage, connected to either side of said biassing resistance means; whereby an exponential output is available across said load impedance in response to a small difference voltage between said input signal and said constant voltage, maintaining said transistor in proximity to cut-off, a resistor connected in the base lead and a resistor connected in the emitter lead of said transistor, the resistances of said resistors having predetermined values, one of which may be zero, to provide means for changing the expansion factor of said exponential relationship.

2. A transistor expander circuit comprising a transistor; a source of predetermined constant voltage coupled at one end thereof to the emitter of said transistor, and coupled at the other end thereof to the collector of said transistor; a load impedance, having output terminals thereacross, connected in series in the emitter-collector circuit; resistance means coupled between said other end of said source of constant voltage and the base of said transistor for the biassing thereof; a pair of input terminals for applying thereto a signal voltage counter said constant voltage, connected to either side of said biassing resistance means; whereby an exponential output is available across said load impedance in response to a small difference voltage between said input signal and said constant voltage, maintaining said transistor in proximity to cut-off, a current limiting resistance connected in series between the collector of the transistor and the said other end of the source of constant voltage.

3. A transistor expander circuit comprising a transistor; a source of predetermined constant voltage coupled at one end thereof to the emitter of said transistor, and coupled at the other end thereof to the collector of said transistor; a load impedance, having output terminals thereacross, connected in series in the emitter-collector circuit; resistance means coupled between said other end of said source of constant voltage and the base of said transistor for the biasing thereof; a pair of input terminals for applying thereto a signal voltage counter said constant voltage, connected to either side of said biasing resistance means, whereby an exponential output is available across said load impedance in response to a small difference voltage between said input signal and said constant voltage, maintaining said transistor in proximity to cut-off, a first resistor connected between the said resistance means and the said other end of said source of constant voltage; a second resistor connected between the said load impedance and the said other terminal of said constant voltage source, and a constant voltage diode connected between the emitter of said transistor and the junction of said resistance means and said first resistor.

4. A transistor expander circuit comprising a transistor; a load impedance connected in series between the emitter and collector of said transistor; a source of predetermined constant voltage connected at one end thereof to the emitter of said transistor; a resistor connected between the collector of said transistor and the other end of said source; a second resistor coupled between said other end of said source and the base of said transistor, for the biasing thereof, a constant voltage diode connected between said second resistor, at the end nearest said other end of said source, and the emitter of said transistor; and a pair of input terminals, for applying thereto a signal counter said constant voltage, connected to either side of said second resistor; whereby an exponential output is available across said load impedance in response to a small difference voltage, maintaining said transistor in proximity to cut-off, between said input signal and said constant voltage.

References Cited in the file of this patent

UNITED STATES PATENTS

| | | |
|---|---|---|
| 2,548,913 | Schreiner et al. | Apr. 17, 1951 |
| 2,629,833 | Trent | Feb. 24, 1953 |
| 2,806,964 | Spades | Sept. 17, 1957 |
| 2,864,903 | Becking et al. | Dec. 16, 1958 |
| 2,897,720 | Offner | Aug. 4, 1959 |

FOREIGN PATENTS

| | | |
|---|---|---|
| 293,165 | Switzerland | Dec. 1, 1953 |